Jan. 4, 1966     E. C. WEISKOPF     3,227,130
IMMERSION APPARATUS FOR HISTOLOGIC TISSUE
Filed Feb. 1, 1962
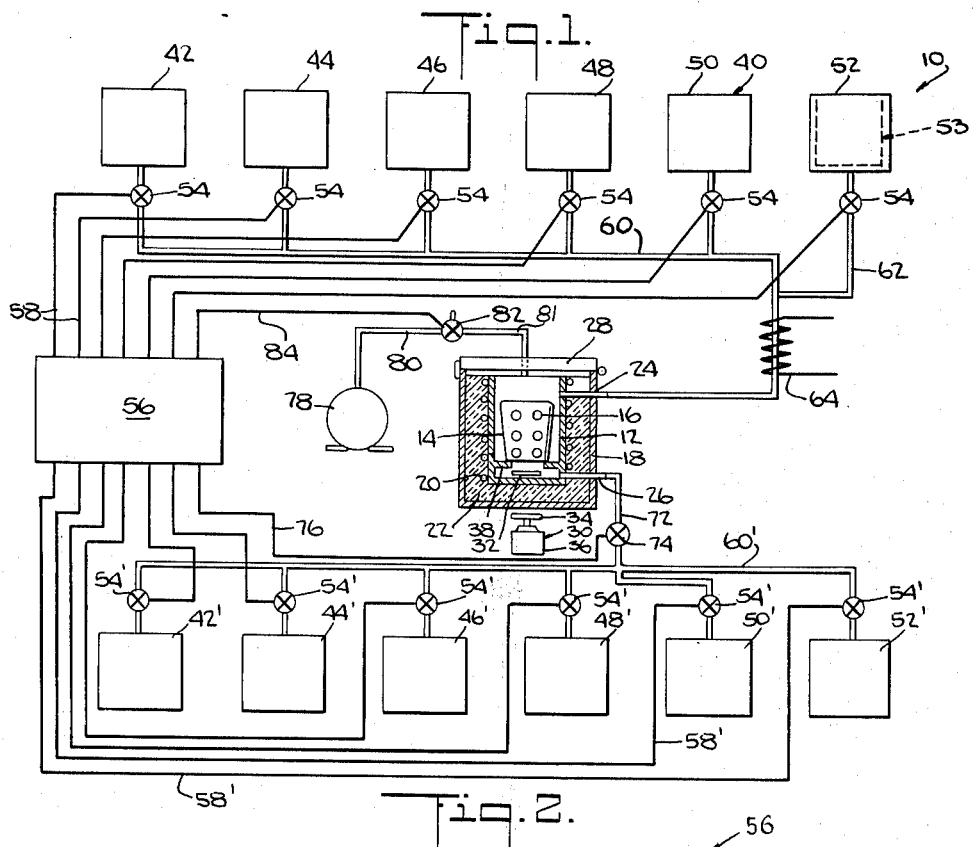
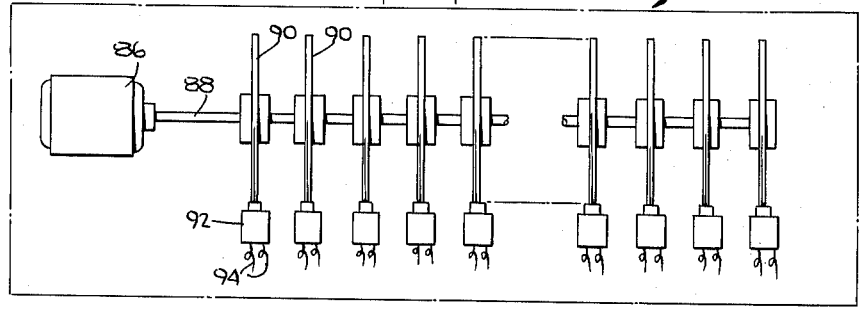
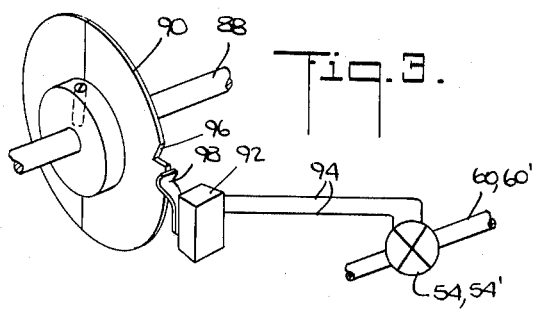
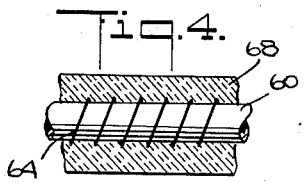
INVENTOR.
EDWIN C. WEISKOPF
BY Harry Cohn
ATTORNEY

3,227,130
IMMERSION APPARATUS FOR HISTOLOGIC TISSUE
Edwin C. Weiskopf, Brewster, N.Y., assignor to The Technicon Company, Inc., Chauncey, N.Y., a corporation of New York
Filed Feb. 1, 1962, Ser. No. 170,398
5 Claims. (Cl. 118—11)

This invention relates to the treatment of material by a series of liquids and, more particularly, to the histological treatment of animal tissue, especially human tissue, to condition the tissue for microscopic examination.

A primary object of my present invention is to provide apparatus for the preparation of histologic tissue for microscopic examination whereby to reduce the time required for such preparation.

Another primary object is to provide automatic tissue processing apparatus which can be produced at lower cost than automatic tissue processors now available and by the use of which the time required for the processing operations can be greatly reduced without sacrifice of quality of the prepared tissue.

More specifically stated, the purpose of this invention is to reduce the time required for tissue processing without impairment of quality of the prepared tissue and to provide, at comparatively low cost, an automatic tissue processor by which this indicated purpose can be accomplished.

The above and other objects, features and advantages of the invention will be more fully understood from the following description of the presently preferred embodiment of the invention considered in connection with the accompanying drawings which are illustrative of the invention and not in limitation thereof.

In the drawings:

FIG. 1 is a more or less diagrammatic view illustrating the apparatus of the invention;

FIG. 2 is a diagrammatic illustration, on a larger scale, of the programming device of the apparatus shown in FIG. 1;

FIG. 3 is a perspective view of part of the programming device; and

FIG. 4 is a detail view, in section, of part of the apparatus of FIG. 1.

Although the invention may be utilized for treating various materials with a series of liquids, it is especially useful and intended primarily for the histological treatment of human tissue to prepare said tissue for microscopic examination.

Pursuant to this invention, briefly described, the tissue specimens to be processed for microscopic examinations are placed in a basket which is mounted in a heat-insulated chamber or container having a liquid inlet and a liquid outlet. A series of supply receptacles, each containing a tissue treating liquid, is provided in liquid flow communication with the inlet of the chamber. The flow of the various liquids to the chamber for treating the tissue is controlled by a programming device so that the liquids are transmitted to the inlet of the chamber seriatim, whereby the tissue is treated separately by each of the liquids. To improve and accelerate the infiltration of the tissue by the various processing liquids, the pressure in the chamber is reduced to below atmosphere, the liquids are heated, and means are provided for stirring the liquids in relation to the tissue specimens. The programming device includes means for predetermining the lengths of periods during which each of the liquids is in the chamber for treating the tissue. The apparatus also includes means for separately collecting the various liquids after the treatment of the tissue therewith, so that the liquids may be used repeatedly, if so desired.

Referring now to the drawings in detail, the tissue treating apparatus 10 comprises a stationary chamber 12 in which a basket 14 is mounted. The basket has provision for holding a series of tissue specimens which are to undergo histological treatment and is provided with a series of openings 16 to permit unobstructed flow of the liquid into and out of the basket so that different portions of the treating liquid are continuously brought into contact with the tissues. The tissue specimens are ordinarily disposed in individual perforated small receptacles and each basket can hold a comparatively large number of tissue specimens for simultaneous treatment thereof by each liquid in the chamber. The chamber is provided with an insulating jacket 18 and a heating electric wire 20 may be provided in the insulation 22 surrounding the chamber. The heating wire is coiled about chamber 12 for heating the latter and maintaining it at a predetermined temperature.

The chamber is provided with a liquid inlet 24 and a liquid outlet 26 and the top of the chamber is provided with a hinged cover 28. A stirring device 30 is provided for continuously circulating the liquid in the chamber. More particularly, the stirring device comprises a bar 32 of magnetic material which is preferably sealed within a glass envelope that is disposed within chamber 12 and is freely rotatable therein. A magnet 34, rotated by a motor 36, is positioned adjacent the bottom of insulating jacket 18 and is operable to rotate bar 32 within the chamber causing the liquid therein to circulate through the chamber and the openings 16 of the basket. It will be understood that the supports 38 for the basket are spaced peripherally from each other so as not to interfere with the circulation of the liquid. It will be understood that other means may be used for stirring the liquid in chamber 12, and that when a magnetic stirrer is employed the material between the magnet 34 and the stirrer bar should be non-magnetic.

A series of stationary liquid-supply receptacles 40 are provided for the treating liquids and it will be understood that any number of receptacles can be provided depending upon the type of treatment required. As illustrated herein, there are six receptacles shown and it will be understood that each receptacle contains a particular treating liquid. For example, with respect to the histological treatment of human tissue, receptacle 42 can contain a fixative; receptacle 44, water or other wash liquid; receptacle 46, a dehydrant; receptacle 48, another dehydrant; receptacle 50, a clearing agent and receptacle 52 paraffin, which is used to infiltrate the tissue and thereby condition the tissue so that it can be cut on a microtome, as is well known in the histological treatment of tissue. Receptacle 52 is provided with a thermally controlled electric heater indicated at 53 to maintain the paraffin in a molten condition and the receptacle is provided with heat insulation to minimize the loss of heat therefrom.

Each of the outlets of the receptacles is provided with a solenoid operated valve 54 which is controlled by a programming device 56 and the electrical connecting wires between the programming device and the valves are identified by reference numeral 58. The outlet of each valve 54 is connected to a conduit 60 which is connected to the inlet 24 of the chamber 12. Conduit 62, which connects the outlet of the valve for the paraffin receptacle 52 to conduit 60, is preferably covered with heat-insulating material so that the paraffin from the receptacle does not cool and thereby does not solidify as it flows to chamber 12.

The portion of conduit 60, between the connection of conduit 62 thereto and inlet 24 of the chamber, is provided with an electric resistance heating wire 64. As more clearly shown in FIG. 4, the heating wire is helically wound around the outer surface of conduit 60 which is covered with suitable heat-insulating material 68. The heating wire is operable to heat the liquids to about 60° C. before they enter chamber 12 to improve and quicken the effect of the liquids on the tissues which are being treated. It is within the scope of the invention to provide any suitable means for heating the treating liquids.

A series of stationary liquid receiving receptacles are provided corresponding in number to receptacles 40 for receiving the liquids from chamber 12 after the completion of the treatment of the tissues by the liquids. A receptacle is provided for each of the receptacles 40 and the corresponding receptacles are indicated by numerals 42', 44', 46', 48', 50' and 52'. The inlet of each of the receptacles is controlled by a solenoid operated valve 54' which is also controlled by the programming device 56. The connecting wires for valves 54' and the programming device are indicated by the reference numeral 58'.

Outlet 26 of chamber 12 is connected to the inlets of valves 54' by conduits 72 and 60', respectively. Conduit 72 is provided with a solenoid operated valve 74 for controlling the flow of liquid from chamber 12 and the operation of this valve is also controlled by the programming device 56, and the operative connection is indicated by electric wire 76. The portion of conduit 60' which is between valve 74 and the inlet to receptacle 52' is preferably heat-insulated by suitable material so that the paraffin remains in a liquid condition as it flows from the heated chamber 12 to the receptacle which is heated.

In order to improve the infiltration of the liquid in the tissues, the pressure of chamber 12 is reduced to a predetermined value which is below atmosphere. For this purpose a source of vacuum, here shown as a vacuum pump 78, is provided and the inlet of the pump is connected to the interior of chamber 12, through an opening in cover 28, by passage means 80, 81 which is provided with a solenoid operated valve 82. The portion 81 of passage means 80 between valve 82 and the cover is preferably provided by a flexible conduit to permit the cover to be raised and lowered. The operation of valve 82 is controlled by the programming device 56 as indicated by the electrical lead 84. Valve 82 is a two position valve and in one of its positions the valve is connected to the vacuum pump 78, and in its other position the valve is connected to atmosphere. In both positions of the valve, this valve 82 is always connected to chamber 12 via passage means 80, 81.

The relative positions of receptacles 40, chamber 12 and receptacles 70 are such as to permit the flow of the liquids, perferably by gravity, from the receptacles 40 to the chamber 12 and from the latter to the liquid receiving receptacles 42', 44', 46', 48', 50' and 52'. More particularly, receptacles 40 are positioned at a level which is higher than chamber 12 and the liquid receiving receptacles are positioned at a level which is lower than chamber 12.

In the operation of the apparatus, each of the receptacles 40 is filled with the proper treating liquid and the valves 54 are operated by the programming device 56 in sequence so that liquid from receptacle 42 is first transmitted to chamber 12 for the treatment of the tissue by said liquid and upon completion of a predetermined period of treatment, the liquid is withdrawn from the chamber. When the chamber is empty, liquid from receptacle 44 is introduced therein. In this manner, a series of liquids from the receptacles 40 is transmitted seriatim to chamber 12 for the separate treatment of the tissues by each of said liquids.

Upon initiating the operation of the apparatus, valve 82 is in communicating position with the atmosphere and valve 74 is closed. Valve 54 for receptacle 42 is opened and liquid from the receptacle flows to chamber 12 and is heated before it enters said chamber by heating coil 64. After a sufficient quantity of liquid has been transmitted from receptacle 42 to cover the tissue specimens in chamber 12, valve 54 closes and valve 82 is actuated so that it is in communication with the vacuum pump 78 and the pressure in chamber 12 is reduced to a predetermined value below atmosphere. The apparatus remains in this condition for a predetermined period of time during which the liquid in chamber 12 is circulated by the stirrer 30 for treating the tissues by said liquid.

At the end of the treatment period for the liquid from receptacle 42, valve 82 is actuated so that it is in communication with the atmosphere and valves 74 and 54' (for receptacle 42') are opened and the liqiud from the chamber flows into receptacle 42'. After chamber 12 has been drained of the treating liquid from receptacle 42, valves 74 and 54' are closed and valve 54 for receptacle 44 is opened for a predetermined period of time and treating liquid from said receptacle flows into chamber 12. The valve is then closed and valve 82 is moved into communicating position with vacuum pump 78 and the tissue treating period with liquid from receptacle 44 begins. At the conclusion of said period, valves 74 and 54' (for receptacle 44') are operated and valve 82 is moved into communicating position with the atmosphere so that the liquid in chamber 12 can flow therefrom and into receptacle 44'.

The operation of the apparatus continues in the manner just described until the tissues in the basket 14 have been successively and separately treated by each of the liquids in the receptacles 40 and in this regard it will be noted that each of the liquids which has treated the tissues is separately collected in its respective liquid receiving receptacle. In this manner, the liquids are collected for re-use. During the various treatment periods, stirrer 30 can operate continuously.

As indicated above, the sequence of operations of the apparatus and the operation of the solenoids of the various valves are controlled by the programming device 56. Referring now to FIGS. 2 and 3, which illustrate the programming device, it is to be noted that the device comprises an electric clock motor 86 which drives a shaft 88 on which a series of discs 90 are secured for rotation thereby. Each disc controls the operation of a switch 92 which is connected to the solenoid of a valve by wires 94 and the valve is of the spring type which is normally biased into closed position. The periphery of each disc is provided with a cutout 96 so that as the disc rotates, the cutout moves into position and is engaged by the movable arm 98 of the associated switch 92 for actuating said switch and the solenoid of its associated valve. It will be observed that the position of the cutout 96 determines when the switch is operated and the peripheral length of the cutout determines how long the switch remains in its actuated position. Each disc and its associated switch constitute a bistable actuator for their associated valve. The periods during which the liquids remain in chamber 12 can be easily varied by rotating the associated discs on shaft 88 to vary the position of the cutout 96. It will be understood that one revolution of shaft 88 corresponds to a treatment cycle for the tissues and as the shaft rotates, each solenoid is energized in its turn to open the associated valve and at the completion of the operating period for the valve, the solenoid is de-energized and the valve closes upon the bias of its spring. The discs 90 for controlling the operation of valves 82 and 74 are each provided with a series of peripheral cutouts 96 since these valves are actuated a plurality of times during the operating cycle of the apparatus. A more detailed explanation of the programming device 56 is considered unnecessary since such devices are well known.

Methods of preparing tissue for microscopic examination in the art of histology are well known. For example, various methods are described in my U.S. Patent No. 2,393,580 issued January 22, 1946 and in various text books including Histopathologic Technic and Practical Histochemistry by R. D. Lillie, published in 1954 by The Blakiston Company, Inc., New York, N.Y. and Histopathological Technic by Abram A. Krajian and R. B. H. Gradwohl, second edition, published 1952 by The C. V. Mosby Company of St. Louis, Missouri.

It will be understood that the present invention is applicable to apparatus in which various fixatives, dehydrants, clearing agents and impregnating agents for embedding the tissue to form a block may be used.

According to the invention, the time required for treating the tissue with the fixative is about 15 to 20 minutes, with the water about 3 minutes, with the dehydrant about 18 minutes, with the clearing agent about 5 to 8 minutes and with the paraffin about 15 minutes. It is to be understood that these times are not critical or limitative and are given to indicate the substantial decrease in overall time for completing the preparation of the tissue in comparison with known methods of the type referred to in my above indicated patent.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for processing histologic tissue for microscopic examination wherein the tissue is immersed seriatim for pre-determined periods in each of a plurality of different treating liquids, comprising: a first perforate receptacle for receiving the tissue; a plurality of second receptacles, each for storing a different treating liquid; immersion means for immersing said first receptacle seriatim in each of the plurality of liquids; a vacuum pump; coupling means for alternatively coupling said immersion means to said vacuum pump and to the atmosphere; programming means coupled to said immersion means and to said coupling means for controlling said immersion means to immerse said first receptacle seriatim for variable periods of time in each of the plurality of liquids and coupled to said vacuum pump for placing said first receptacle under a vacuum for a variable period of time while it is immersed in each of a plurality of liquids.

2. Apparatus for processing histologic tissue for microscopic examination wherein the tissue is immersed seriatim for pre-determined periods in each of a plurality of different treating liquids, comprising: a first perforate receptacle for receiving the tissue; a plurality of second receptacles, each for storing a different treating liquid; immersion means for immersing said first receptacle seriatim in each of the plurality of liquids; a vacuum pump; coupling means for alternatively coupling said immersion means to said vacuum pump and to the atmosphere; programming means coupled to said immersion means and to said coupling means for controlling said immersion means to immerse said first receptacle seriatim for variable periods of time in each of the plurality of liquids and coupled to said vacuum pump for placing said first receptacle under a vacuum for a variable period of time while it is immersed in each of the plurality of liquids.

3. Apparatus for processing histologic tissue for microscopic examination wherein the tissue is immersed seriatim for predetermined periods in each of a plurality of different treating liquids, comprising: a first liquid and air tight receptacle for receiving the tissue; a plurality of second receptacles, each for storing a different treating liquid; third means for receiving used treating liquid; fourth means for alternatively coupling each of said plurality of second receptacles for fluid flow to said first receptacle; fifth means for coupling said first receptacle for fluid flow to said third means; sixth means for drawing a vacuum; seventh means for alternatively coupling said sixth means to said first receptacle for drawing a vacuum therein and coupling said first receptacle to the atmosphere for discharging such vacuum therein; and programming means coupled to said fourth means and to said fifth means for actuating said fourth means and said fifth means to selectively pass each treating liquid singularly into said first receptacle, to retain such liquid in said first receptacle for a given time duration, and to discharge such liquid from said first receptacle to said third means, and also coupled to said seventh means for actuating said seventh means to draw a vacuum in said first receptacle when each of the plurality of treating liquids has been passed into said first receptacle, to retain such vacuum for a given time duration, and to discharge such vacuum prior to the discharge of such liquid from said first receptacle.

4. Apparatus for processing histologic tissue for microscopic examination wherein the tissue is immersed seriatim for predetermined periods in each of a plurality of different treating liquids, comprising: a first perforate receptacle for receiving the tissue; a second liquid and air tight receptacle for receiving said first receptacle; a plurality of third receptacles, each for storing a different treating liquid; fourth means for receiving used treating liquid; fifth means for alternatively coupling each of said plurality of third receptacles for fluid flow to said second receptacle; sixth means for coupling said second receptacle for fluid flow to said fourth means; seventh means for drawing a vacuum; eighth means for alternatively coupling said seventh means to said second receptacle for drawing a vacuum therein and coupling said second receptacle to the atmosphere for discharging a vacuum therein; programming means coupled to said fifth means and to said sixth means for actuating said fifth means and said sixth means to selectively pass each treating liquid singularly into said second receptacle, to retain such liquid in said second receptacle for a given time duration, and to discharge such liquid from said second receptacle to said fourth means, and also coupled to said eighth means for actuating said eighth means to draw a vacuum in said second receptacle when each of the plurality of treating liquids has been passed into said second receptacle, to retain such vacuum for a given time duration, and to discharge such vacuum prior to the discharge of such liquid from said second receptacle; and stirring means disposed within said second receptacle and without said first receptacle for circulating treating liquid through said perforate first receptacle.

5. Apparatus for processing histologic tissue for microscopic examination wherein the tissue is immersed seriatim for predetermined periods in each of a plurality of different treating liquids, comprising: a first liquid and air tight receptacle for receiving the tissue; a plurality of second receptacles, each for storing a different treating liquid; third means for receiving used treating liquid; an inlet manifold coupled to said first receptacle, and a plurality of remotely operable first valves, each respectively for coupling one of said plurality of second receptacles for fluid flow to said manifold; a remotely operable second valve for coupling said first receptacle to said third means; a vacuum pump; a remotely operable third valve for alternatively coupling said vacuum pump to said first receptacle for drawing a vacuum therein and coupling said first receptacle to the atmosphere for discharging such vacuum therein; and adjustable programming means including a plurality of single cycle, first bistable actuators, each independently adjustable with respect to time for delay to on condition and interval on, each respectively coupled to one of said plurality of first valves for actuating said first valve to pass liquid to said manifold, a multi-cycle second bistable actuator, independently adjustable with respect to time for delay to on condition and interval on, coupled to said second valve for actuating said second valve to pass liquid to said third means, and a multi-cycle third bistable actuator, independently adjustable with respect to time for delay to on condition and interval on, coupled to said third valve for actuating said third valve to draw a vacuum in said first receptacle when each of the plurality of treating liquids has been passed into said first receptacle, to retain such vacuum for a given time duration, and to discharge such vacuum prior to the discharge of such liquid from said first receptacle.

References Cited by the Examiner

UNITED STATES PATENTS

| | | | |
|---|---|---|---|
| 2,157,875 | 5/1939 | Weiskopf | 214—17 |
| 2,341,198 | 2/1944 | Weiskopf | 118—10 |
| 2,386,079 | 10/1945 | Weiskopf | 118—11 X |
| 2,681,298 | 6/1954 | Ferrari | 167—84.5 |
| 2,684,925 | 7/1954 | Ferrari | 167—84.5 |
| 2,959,151 | 11/1960 | Ehrlich | 118—429 |

CHARLES A. WILLMUTH, *Primary Examiner.*

FRANK CACCIAPAGLIA, Jr., JOSEPH B. SPENCER, RICHARD D. NEVIUS, WILLIAM B. PENN,
*Examiners.*